(12) United States Patent
Yasuda et al.

(10) Patent No.: US 9,173,464 B2
(45) Date of Patent: Nov. 3, 2015

(54) CONTACT LENS CASE

(75) Inventors: Akihiro Yasuda, Kasugai (JP); Osamu Mori, Kasugai (JP)

(73) Assignee: MENICON CO., LTD., Nagoya-shi (JP)

( * ) Notice: Subject to any disclaimer, the term of this patent is extended or adjusted under 35 U.S.C. 154(b) by 0 days.

(21) Appl. No.: 14/409,660

(22) PCT Filed: Jul. 9, 2012

(86) PCT No.: PCT/JP2012/004421
§ 371 (c)(1),
(2), (4) Date: Dec. 19, 2014

(87) PCT Pub. No.: WO2014/009987
PCT Pub. Date: Jan. 16, 2014

(65) Prior Publication Data
US 2015/0150346 A1    Jun. 4, 2015

(51) Int. Cl.
A45C 11/00   (2006.01)
G02C 11/00   (2006.01)
A45C 13/02   (2006.01)

(52) U.S. Cl.
CPC ............... *A45C 11/005* (2013.01); *A45C 13/02* (2013.01); *G02C 11/00* (2013.01)

(58) Field of Classification Search
CPC ...................................................... A45C 11/005
USPC .......................................... 206/5.1; 134/901
See application file for complete search history.

(56) References Cited

U.S. PATENT DOCUMENTS

| | | | |
|---|---|---|---|
| 5,383,550 A * | 1/1995 | Tsao ............................... | 206/5.1 |
| 2005/0087453 A1* | 4/2005 | Mahieu et al. ................. | 206/5.1 |
| 2008/0185298 A1* | 8/2008 | Kanner et al. ................. | 206/5.1 |
| 2010/0106128 A1* | 4/2010 | Mao et al. ..................... | 604/411 |

FOREIGN PATENT DOCUMENTS

| | | |
|---|---|---|
| CA | 2 344 683 A1 | 3/2000 |
| GB | 2 439 625 B | 5/2008 |
| JP | A-2002-6274 | 1/2002 |
| JP | A-2002-526203 | 8/2002 |
| WO | WO 00/16815 A1 | 3/2000 |

(Continued)

OTHER PUBLICATIONS

International Search Report issued in International Patent Application No. PCT/JP2012/004421 dated Sep. 18, 2012.

(Continued)

*Primary Examiner* — Steven A. Reynolds
*Assistant Examiner* — King M Chu
(74) *Attorney, Agent, or Firm* — Oliff PLC (57) ABSTRACT

A contact lens case including a container main body provided with a housing recess for storing a contact lens and a liquid agent, and a lid that is connected to the container main body via a hinge in a freely openable and closable manner. A lens holding body is displaceably housed in the housing recess, and by connecting the lid and the lens holding body via a connecting member, the lens holding body can undergo rising and falling displacement following open and close action of the lid around the hinge. A displacement restricting member is provided that restricts a direction of the rising and falling displacement of the lens holding body to the vertical direction that coincides with a depth direction of the housing recess.

6 Claims, 10 Drawing Sheets

(56) References Cited

FOREIGN PATENT DOCUMENTS

| WO | WO 2005/039347 A2 | 5/2005 |
| WO | WO 2008/120954 A1 | 10/2008 |

OTHER PUBLICATIONS

Jul. 29, 2015 Office Action Issued in Chinese Patent Application No. 201280074580.8.

* cited by examiner

CONTACT LENS CASE

TECHNICAL FIELD

The present invention relates to a contact lens case used for soaking and storing contact lenses, especially hydrogel soft contact lenses of permanent-wear or periodic replacement type in a preserving solution or for disinfecting the lenses with hydrogen peroxide solution.

BACKGROUND ART

As has been well known, hydrogel soft contact lenses of permanent-wear or periodic replacement type need to be stored in a condition of being soaked in a preserving solution such as physiological saline containing a disinfecting component etc. and protected from drying out or contamination during a period from the removal of the lens from the wearer's eye to the next application thereof. When more certain disinfecting effect is expected, the contact lenses are soaked in hydrogen peroxide solution for more than several hours for disinfection.

By the way, as a structural body that can easily contain and store a liquid agent such as the preserving solution mentioned above or hydrogen peroxide solution as well as contact lenses, a contact lens case has conventionally been used widely. For example, as described in Japanese Unexamined Patent Publication No. JP-A-2002-006274 (Patent Document 1), the structure of the contact lens case comprises a container main body provided with a housing recess for storing preserving solution and contact lenses and a lid installed at the upper opening of the housing recess to cover the upper opening. Also, as a contact lens case capable of providing disinfection using hydrogen peroxide solution, Japanese Domestic Publication of International Patent Application No. JP-A-2002-526203 (Patent Document 2) proposes a case having a structure where a platinum layer is applied to the bottom surface and inner peripheral surface of a shallow housing recess. That is, although hydrogen peroxide solution is decomposed into nontoxic water and oxygen, any undecomposed residue would serve as stimulus against the eyes, and therefore, hydrogen peroxide should be completely neutralized by dissolution before the completion of the disinfection treatment of the contact lenses by means of accelerating and adjusting the dissolution reaction using a catalyst such as platinum.

However, various problems have been pointed out in terms of hygiene, safety and operability of the conventionally structured contact lens case described above. For example, in storing contact lenses that have been worn all day, there is a case where a liquid agent such as a preserving solution or hydrogen peroxide solution is filled in the housing recess of the contact lens case, and then the contact lenses are removed by being picked with the user's fingers from the user's eyes to be stored in the housing recess. In this case, there is a good possibility that the user's fingers get in touch with the preserving solution, and if the liquid agent is indeed a preserving solution, there is a concern about the preserving solution being contaminated by the contact with the user's fingers. If the liquid agent is hydrogen peroxide solution, there is a risk that the user's fingers would touch the solution before neutralizing reactions, which is an irritant substance, when one of the contact lenses is stored in the housing recess, and when the other contact lens is removed from the eye with the fingers, hydrogen peroxide solution would get into the eye.

Also, in case of reusing contact lenses stored in a contact lens case, the user has to insert his/her fingers into the housing recess filled with a liquid agent to pick up each contact lens. Therefore, it is inevitable to spill the liquid agent over the housing recess where the fingers are inserted, thus causing a problem of being unable to wear on the contact lenses except in the place where spilling of the liquid agent causes no problem. Also, when the contact lenses are picked up from the liquid agent, there could be a risk that the contact lenses may float within the liquid agent and turn upside down, thereby preventing them from being easily picked up from the housing recess.

BACKGROUND ART DOCUMENT

Patent Document

Patent Document 1: JP-A-2002-006274
Patent Document 2: JP-A-2002-526203

SUMMARY OF THE INVENTION

Problem the Invention Attempts to Solve

The present invention was made against the background described above, and the problem to be solved is to provide a contact lens case with a novel structure capable of allowing the contact lenses to be stored and removed in and from the housing recess in an easy and stable manner, while improving the hygiene and safety of the operation of storing and removing the contact lenses.

Means for Solving the Problem

A first aspect of the present invention provides a contact lens case including: a container main body provided with a housing recess configured to store a contact lens and a liquid agent for soaking the contact lens; and a lid that is connected to the container main body via a hinge in a freely openable and closable manner so as to cover an upper opening of the housing recess, the contact lens case being characterized in that: a lens holding body that holds the contact lens is housed in the housing recess in a displaceable manner; the lid and the lens holding body are connected via a connecting member so that the lens holding body undergoes rising and falling displacement following open and close action of the lid around the hinge; a displacement restricting member is provided that restricts a direction of the rising and falling displacement of the lens holding body to a vertical direction that coincides with a depth direction of the housing recess.

According to the contact lens case having the structure of the present aspect, the lens holding body undergoes rising and falling displacement following the open and close action of the lid, while the direction of such rising and falling displacement of the lens holding body is restricted by the displacement restricting member to the vertical direction of the housing recess. Therefore, in rotating the lid of the contact lens case in the direction of opening, an external force is applied to the lens holding body to displace it diagonally upward by having the rotation of the lid transmitted to the lens holding body via the connecting member. In this process, since the upward displacement of the lens holding body is restricted by the displacement restricting member to the vertical direction of the housing recess, the lens holding body can be lifted straight upward in the housing recess.

In summary, in containing and storing the contact lenses in the contact lens case, the lens holding body is shifted upward in the housing recess following the movement of the lid in the direction of opening. This allows the lens removed from the user's eye to be easily placed on the lens holding body lifted upward from the bottom of the lens housing recess, preventing the user's fingers from touching the liquid agent contained therein when the lens is placed on the holding body. Therefore, a conventional risk of having the user's fingers touch the preserving solution to contaminate it or hydrogen peroxide solution coming in contact with the user's fingers and eyes can be avoided.

Especially in the present aspect, the displacement restricting member restricts the direction of the rising and falling displacement of the lens holding body following the open and close action of the lid to the vertical direction of the housing recess. This prevents the lens from slipping down due to the lateral sliding of the lens holding body in the liquid agent, making it possible to displace the contact lens in the vertical direction of the housing recess under a stable holding condition in the lens holding body. Therefore, there is no need any more to provide a tall protection wall and the like preventing the lens from sliding down from the lens holding body around the holding area of the contact lens, thus making the access easier to the contact lens held by the lens holding body.

The connecting member can be in any configuration as long as it connects the lid to the lens holding body so as to transmit the rotation of the lid to the lens holding body, and can be any structure such as the one with a link mechanism having a bent in the middle or an elastic deflection piece. In addition, the displacement restricting member can be anything as long as it can restrict the movement of the lens holding body in the housing recess in the vertical direction, which is the depth direction of the housing recess. For example, the displacement direction of the lens holding body can be restricted by providing a protrusion that slides along a guiding groove that extends in the vertical direction between the opposing surfaces of the housing recess and the lens holding body, or the displacement of the lens holding body can be guided by a protrusion, in the protruding direction, that protrudes upward from the bottom face of the housing recess and is arranged through the through-hole provided in the lens holding body.

A second aspect of the present invention provides the contact lens case according to the first aspect, wherein a temporary holding member is provided that temporarily holds the lens holding body at an upper position of the housing recess where the lens holding body is displaced by opening the lid.

According to the present aspect, it is now possible to temporarily hold the lens holding body located in the upper position of the housing recess by the opening action of the lid in the same upper position. This allows the lens holding body to be maintained at the upper position even after the user releases the hold of the lid, thus facilitating the mounting and dismounting operations of the lens to and from the lens holding body.

As a temporary holding member, any temporary holding mechanism can be adopted such as one engaging the lens holding body with a ride-over protrusion that is elastically deformable, or otherwise, laterally sliding the lens holding body to engage it with an engaging part.

A third aspect of the present invention provides the contact lens case according to the first or second aspect, wherein the displacement restricting member includes a guiding groove that opens onto an inner surface of the housing recess while extending in the vertical direction and a sliding protrusion that protrudes from the lens holding body and is fitted in the guiding groove to slide therein.

According to the present aspect, a displacement restricting member can be provided between the opposing faces of the housing recess and the lens holding body, which enables to restrict the displacement of the lens holding body without increasing the size of the contact lens case.

A fourth aspect of the present invention provides the contact lens case according to the third aspect wherein a top end of the guiding groove is bent toward the hinge of the lid so as to be connected to a side groove that extends in a lateral direction, and the temporary holding member that temporarily holds the lens holding body at the upper position of the housing recess is provided by the sliding protrusion being fitted in the side groove.

According to the present aspect, the temporary holding member can be configured with a simple structure where the side groove is made by extending the top end of the guiding groove toward the hinge. Also, since the lens holding body can be moved toward the hinge of the lid by means of fitting the sliding protrusion of the lens holding body in the side groove, a large space can be secured in front part of the housing recess (opposite from the hinge side). This facilitates the operation of pouring a liquid agent into the housing recess and the like. Also, since the lid is opened even wider due to the shift of the lens holding body from the top end of the guiding groove to the side groove, it is made easier to mount and dismount the lens to and from the lens holding body with no interruption by the lid.

A fifth aspect of the present invention provides the contact lens case according to any of the first to fourth aspects wherein the liquid agent that the housing recess is configured to store is hydrogen peroxide solution, and a catalyst is held by the lens holding body.

According to the present aspect, a suitable contact lens case can be provided in soaking a contact lens in hydrogen peroxide solution for disinfection. In other words, since the lens holding body is lifted upward in the housing recess when the contact lens is mounted and dismounted to and from the lens holding body, a risk of exposing the user's fingers and eyes to a stimulant, namely hydrogen peroxide before neutralizing reactions, can be duly prevented. Furthermore, since the catalyst is held by the lens holding body, hydrogen peroxide solution filled in the housing recess can be prevented from starting to neutralize before the contact lens is soaked, thus enabling to provide more effective disinfection of contact lenses by hydrogen peroxide.

A sixth aspect of the present invention provides the contact lens case according to any of the first to fifth aspects wherein a pair of lens placing parts are provided in the lens holding body. According to the present aspect, the open and close operation of a single lid allows the placing parts of the lenses for both eyes to rise and fall, thus improving the operability thereof. Also, since the placing parts of the lenses for both eyes can be contained in a single housing recess, the entire case can be made compact and the number of parts can be reduced.

A seventh aspect of the present invention provides the contact lens case according to the sixth aspect wherein the lens placing parts have a shape of a partial spherical shell that is convex upward. In the present aspect, the lens removed from the eye is stored by abutting the back face thereof against the lens placing part, while, the contact lens can be removed from the lens holding body by picking only the front face of the lens with the fingers for wearing on the eye. Therefore, the problem such that the back face of the contact lens to be in direct contact with the eye gets contaminated by the user's fingers or by foreign matters attached thereon can be favorably avoided, thus achieving improvements in hygienic conditions and wearing comfort of the contact lens.

Effect of the Invention

According to the present invention, the lens holding body undergoes rising and falling displacement following the open and close action of the lid, while the direction of the rising and falling displacement of the lens holding body is restricted to the vertical direction of the housing recess by the displacement restricting member. Therefore, the user can easily place the lens removed from his/her eye on the lens holding body by having the lens holding body moved upward in the housing recess following the movement of the lid in the direction of opening, thereby enabling to avoid the user's fingers from touching the liquid agent contained in the housing recess, thus improving the hygiene and safety of the operation.

EMBODIMENTS FOR CARRYING OUT THE INVENTION

Embodiments of the present invention will be described below in reference to the drawings.

FIGS. 1 to 8 show a contact lens case 10 as a first embodiment of the present invention. The contact lens case 10 has a structure including a container main body 14 provided with a housing recess 12 therein, and a lid 16 that covers the upper opening of the housing recess 12 and is connected to the container main body 14 via a hinge 18 in a freely openable and closable manner. Besides, a lens holding body 20 that holds a contact lens 22 is contained in the housing recess 12 in a displaceable manner. The contact lens 22 held by the lens holding body 20 is configured to be stored in the housing recess 12 together with a preserving solution 23 such as physiological saline as a liquid agent for soaking the contact lens 22. In the following descriptions, the vertical direction means the up and down direction in FIG. 1. Also, for better understanding, the contact lens 22 and the preserving solution 23 contained in the contact lens case 10 are shown in imaginary lines in FIGS. 1 to 4.

Figure 1:
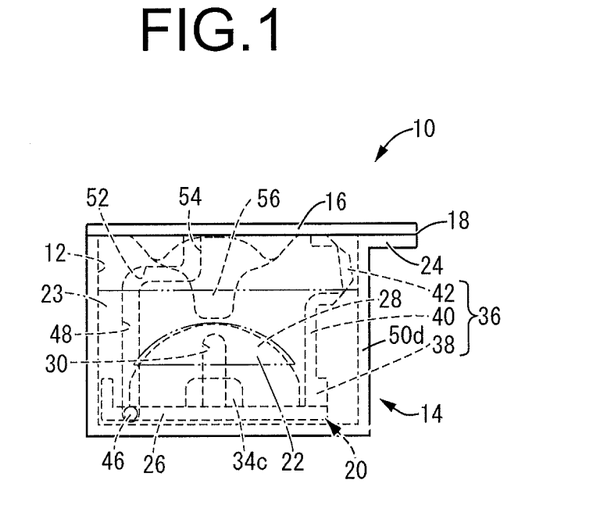
FIG. 1 is a side view of a contact lens case as a first embodiment of the present invention.
Figure 2:
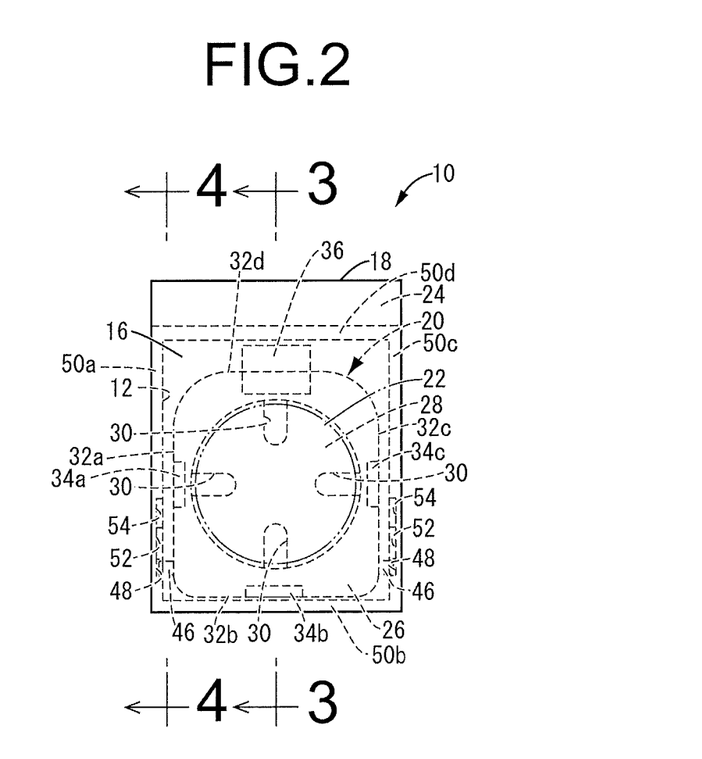
FIG. 2 is a plan view of the contact lens case shown in FIG. 1.

More specifically, the container main body 14 of the contact lens case 10 shown in FIG. 1 is in a shape of a rectangular prism with a bottom, and the housing recess 12 is configured therein that opens upward due to the existence of the interior space. At the top end of a side wall 50d of the container main body 14, a flange 24 is provided in a rectangular shape in a plan view extending like a sword guard, and the lid 16 is integrally connected thereto in a freely rotatable manner via the hinge 18 composed of a bendable thin plastic piece provided at the protruded tip of the flange 24. The lid 16 is made in a rectangular shape in approximately the same size as the container main body 14 in a plan view, being made large enough to cover the entire upper opening of the housing recess 12 under a closed condition where it overlaps the top face of the container main body 14. Preferably, the container main body 14 and the lid 16 are integrally formed of a synthetic resin material such as polyethylene terephthalate, polypropylene, polystyrene or the like. Also, the container main body 14 and the lid 16 are made translucent as a whole so that the lens holding body 20 and the contact lens 22 and the like stored inside the container main body 14 are visually recognizable from outside through the container main body 14.

The lens holding body 20 to be stored in the housing recess 12 of the container main body 14 is made of a synthetic resin material such as polyethylene terephthalate and polypropylene, being formed separately from the container main body 14 and the lid 16. The lens holding body 20 comprises a base member 26 in an approximate shape of a rectangular plate in one size smaller than the housing recess 12 and a lens placing part 28 protruding in a shape of a partial spherical shell that is convex upward roughly in the middle of the base member 26. At multiple locations in the lens placing part 28 (four locations in the present embodiment) away from each other by a given distance around the central axis, through-holes 30, 30, 30, 30 are provided vertically therethrough extending from the outer periphery inward in the radial direction in a length short of reaching the center (see FIGS. 2 and 3). The overall height of the lens holding body 20 is made substantially smaller than the depth of the housing recess 12.

On the base member 26, protection walls 34a, 34b, 34c are integrally formed to protrude upward therefrom in a shape of a rectangular plate at locations roughly in the middle in the length direction of the three side edges 32a, 32b and 32c, respectively, each away from the hinge 18 of the container main body 14. The protection walls 34a, 34b, 34c are able to exert a function of preventing the contact lens 22 from coming off of the lens holding body 20, and the height of protrusion thereof is made substantially smaller than the height of protrusion of the lens placing part 28 so as not to interfere with the operation of placing the contact lens 22 on the lens placing part 28.

On the side edge 32d adjacent to the hinge 18 of the base member 26, a connecting member 36 is fixed and bonded at roughly in the middle in the length direction to connect the lid 16 and the lens holding body 20. The connecting member 36 is formed with a synthetic resin material such as polypropylene, being extended between the base member 26 and the lid 16 in an approximate form of a band plate. The upper part of a middle portion 40 protruding straight up from a base portion 38 is made to be a top portion 42 that is bent toward the hinge 18. In the middle of the top portion 42 in the length direction, bending parts 44a, 44b that are made thin to be bend-deformable are provided at two locations away from each other in the length direction. Then, the upper face of the top portion 42 that is bent approximately in a C-shape in side view at the bending parts 44a, 44b is firmly fixed and bonded to the rear face of the lid 16 by adhesion or welding.

Furthermore, at the far end of the base member 26 of the lens holding body 20 away from the hinge 18 along the side edges 32a, 32c, a pair of sliding protrusions 46, 46 are integrally provided to protrude outward. Each sliding protrusion 46 is made in a shape of a circular cylinder extending with almost a constant circular cross-section and is fitted to slide in a guiding groove 48 that opens onto the inner face of the housing recess 12 described later.

Figure 4:
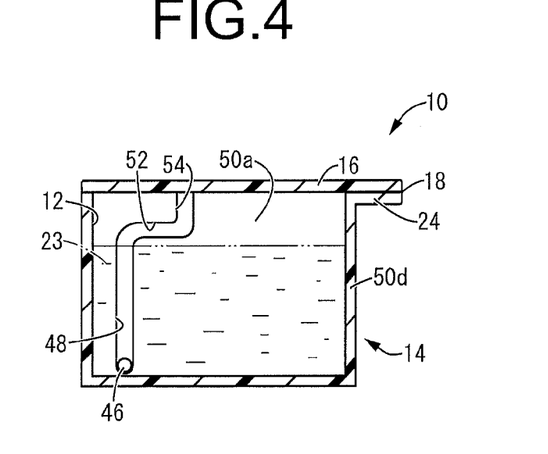
FIG. 4 is a cross-section view taken along line 4-4 of FIG. 2.
Figure 5:
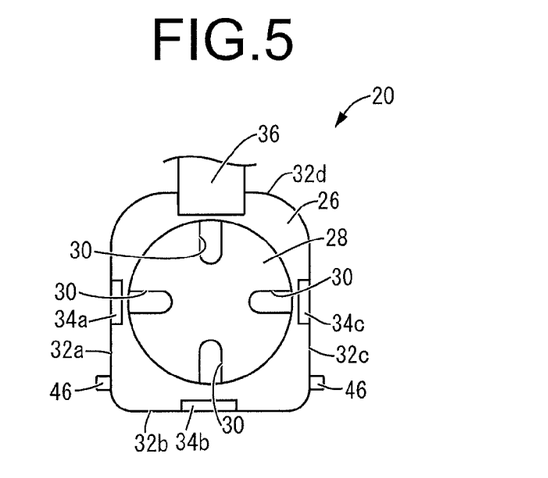
FIG. 5 is a plan view of a lens holding body constituting the contact lens case shown in FIG. 1.

FIG. 4 shows the guiding groove 48 that is formed in the container main body 14 on a side wall 50a arranged to face the side edge 32a of the base member 26 of the lens holding body 20, opening on the inner face of the housing recess 12. The same guiding groove 48 is also formed on a side wall 50c of the container main body 14 arranged to face the side edge 32c of the base member 26, but since both are in an identical shape, detailed description will be given to the guiding groove 48 provided on the side wall 50a in the following paragraphs.

The guiding groove 48 extends in the vertical direction (see FIGS. 1, 3 and 4), which is the depth direction of the housing recess 12, directing straight from the bottom portion of the housing recess 12 toward the upper opening thereof. The top end of the guiding groove 48 is bent toward the hinge 18 in the middle portion in the depth direction of the housing recess 12 that doesn't reach the upper opening so as to be connected to a side groove 52 that extends in the lateral direction. The end of the side groove 52 on the side of the hinge 18 extends straight toward the upper opening of the housing recess 12 to be connected to an opening 54 that opens to the top face of the side wall 50a of the container main body 14. The guiding groove 48 and the side groove 52 are formed in a depth and width sufficient for the sliding protrusion 46 provided in the lens holding body 20 to be fitted to slide therein.

Then, the lens holding body 20 connected to the lid 16 via the connecting member 36 is assembled to the housing recess 12 of the container main body 14 in the following manner: First, the sliding protrusions 46, 46 that protrude from the base member 26 of the lens holding body 20 are fitted in the openings 54, 54 that open to the top face of the side walls 50a, 50c of the container main body 14. After pushing in the base member 26 until the sliding protrusions 46, 46 have abutted against the side grooves 52, 52, the lid 16 is rotated in the direction of closing (to the left in FIG. 7) around the hinge 18. At this moment, the closing action of the lid 16 around the hinge 18 is transmitted via the top portion 42 of the connecting member 36 as an external force that slides the middle portion 40 in the lateral direction away from the hinge 18 (to the left in FIG. 7). This allows the sliding protrusions 46, 46 of the base member 26 to slide to reach the left end of the side groove 52. When the lid 16 is further rotated in the direction of closing, the sliding protrusions 46, 46 that have reached the left end of the side groove 52 are guided along the guiding groove 48 vertically extending downward to slide toward the bottom portion of the housing recess 12. At this moment, due to the closing action of the lid 16 around the hinge 18, the top portion 42 of the connecting member 36 is gradually bent at the bending parts 44a, 44b to be made in an approximate C-shape. This allows the closing action of the lid 16 around the hinge 18 to be transmitted as an external force that pushes down the middle portion 40 via the top portion 42 of the connecting member 36. Therefore, the sliding protrusions 46, 46 of the base member 26 get forced down along the guiding groove 48 to the bottom end thereof. Ultimately, the lid 16 is superposed on the top face of the container main body 14 to cover the upper opening of the housing recess 12 by the lid 16, while the lens holding body 20 is stored and arranged on the bottom side of the housing recess 12 (see FIGS. 1 and 3).

In the present embodiment, a holding protrusion 56 is integrally formed with the rear face of the lid 16 in the middle thereof protruding downward in an approximate shape of a funnel. The holding protrusion 56 is formed almost coaxially with the lens placing part 28 provided in the lens holding body 20, and with the lid 16 closed, the apex of the holding protrusion 56 is arranged to face the contact lens 22 placed on the apex of the lens placing part 28 with a gap in between. This allows the contact lens 22 to be pushed back toward the lens placing part 28 by being abutted against the lens holding protrusion 56 even if the contact lens 22 floats up from the lens placing part 28 due to the flow and vibration or the like of the preserving solution. This prevents the contact lens 22 from coming off of the lens placing part 28 to float up or reverse front and back within the housing recess 12. For better understanding, the holding protrusion 56 is not shown in FIG. 2.

Figure 6:
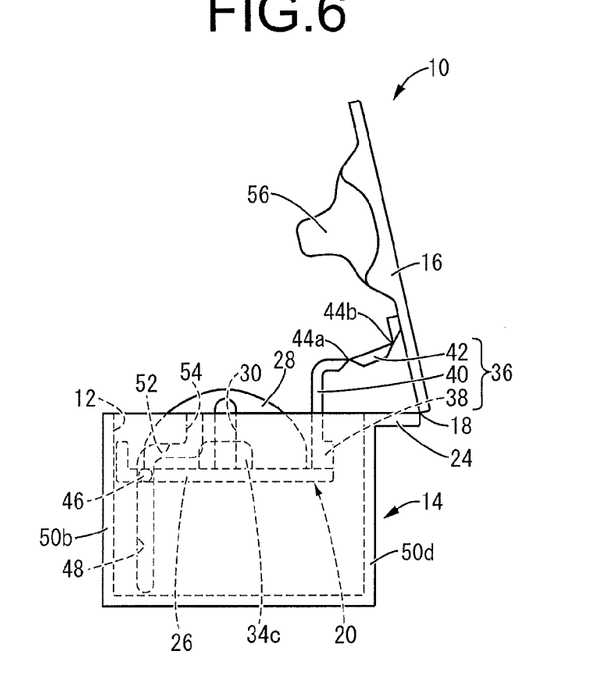
FIG. 6 is a side view showing a usage of the contact lens case shown in FIG. 1.

The usage of the contact lens case 10 of the present embodiment with the structure described above will be explained below in reference to FIGS. 6 to 8. When storing the contact lens 22 removed from the eye in the contact lens case 10, the user first rotates the lid 16 in the direction of opening (to the right in FIG. 6) around the hinge 18 as shown in FIG. 6. At this moment, the opening action of the lid 16 around the hinge 18 is transmitted as an external force that lifts up the middle portion 40 diagonally via the top portion 42 of the connecting member 36 due to the gradual extension thereof caused by the bending parts 44a, 44b. Such an external force is transmitted to the base member 26 of the lens holding body 20 fixed and bonded to the base portion 38 of the connecting member 36 so that the external force is applied to the entire lens holding body 20 to lift it up diagonally.

Under these circumstances, since the sliding protrusions 46, 46 that protrude from the base member 26 of the lens holding body 20 are fitted in the guiding grooves 48, 48 that open on the inner face of the housing recess 12, as the lid 16 is rotated in the direction of opening, the sliding protrusions 46, 46 are guided to displace themselves only straight upward while sliding along the guiding grooves 48, 48 so that any lateral or diagonally upward displacement is prevented.

When the lid 16 is further rotated in the direction of opening after the sliding protrusions 46, 46 reach the top end of the guiding grooves 48, 48, an external force is transmitted that slides the lens holding body 20 via the connecting member 36 in the lateral direction, namely the direction of getting closer to the hinge 18. This allows the sliding protrusions 46, 46 of the lens holding body 20 to be fitted in the side grooves 52, 52 from the top end of the guiding grooves 48, 48, as shown in FIG. 7. Under such conditions, the lens holding body 20 is prevented from shifting downward by having the sliding protrusions 46, 46 held by abutment against the side grooves 52, 52 so that the lens holding body 20 can temporarily be held at the upper position of the housing recess 12, which coincides with the upper end of the guiding grooves 48, 48. As evident from this, in the present embodiment, the temporary holding member is provided by the sliding protrusions 46, 46 being fitted in the side groove 52. Even if the lid 16 is released from the user's grasp under a condition where the sliding protrusions 46, 46 are fitted in the side grooves 52, 52, the lid 16 is held at the same position due to the sliding friction between the sliding protrusion 46 and the side groove 52 so that the sliding protrusions 46, 46 are prevented from coming off of the side grooves 52, 52, or the lid 16 is prevented from rotating in the direction of closing.

Thus, under a condition where the lens holding body 20 is temporarily held by the temporary holding member at the upper position of the housing recess 12, the entire lens placing part 28 of the lens holding body 20 protrudes upward above the upper opening of the housing recess 12. This allows the user to easily perform the action of placing the contact lens 22 on the lens placing part 28 within a wide space without being interrupted by the side wall of the housing recess 12 and the like. Also, since the lens placing part 28 of the lens holding body 20 is temporarily held at a completely protruded position above the housing recess 12, the exposure of the user's fingers to the preserving solution 23 can be avoided even if the housing recess 12 is filled with the preserving solution 23 at this stage, thus enabling to prevent contamination of the preserving solution 23. In the present embodiment, since the lens placing part 28 is in a shape of a partial spherical shell that is convex upward, the back face of the contact lens 22 to be worn over the eye is placed on the surface of the lens placing part 28.

Also, since the lid 16 is to be rotated significantly in the direction of opening in order to fit the sliding protrusions 46, 46 of the lens holding body 20 in the side groove 52, any interruption by the lid 16 with the action of placing the contact lens 22 on the lens placing part 28 is successfully prevented. Also, since the lens holding body 20 as a whole is displaced toward the hinge 18 so as to fit the sliding protrusions 46, 46 of the lens holding body 20 in the side groove 52, a space is formed between a side wall 50b of the container main body 14, which is an opposite side of the hinge 18, and the lens holding body 20, making it easier to fill the housing recess 12 with the preserving solution 23 contained in a container 58.

As described above, after the contact lens 22 is placed on the lens placing part 28 and the preserving solution 23 is filled in the housing recess 12, the lid 16 is rotated in the direction of closing (to the left in FIG. 7) around the hinge 18. As stated above, the action of closing the lid 16 is transmitted to the base member 26 via the connecting member 36 to slide the sliding protrusions 46, 46 to the left end of the side groove 52. In addition, once the lid 16 is rotated in the direction of closing, the sliding protrusions 46, 46 that have reached the left end of the side groove 52 are guided along the guiding groove 48 that extends vertically downward to slide toward the bottom of the housing recess 12.

Figure 3:
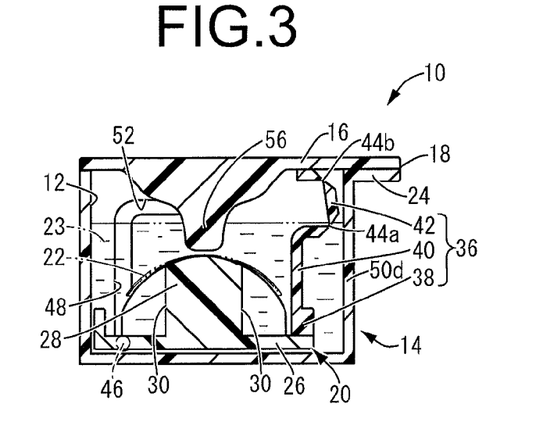
FIG. 3 is a cross-section view taken along line 3-3 of FIG. 2.

Then, as shown in FIG. 3, the lid 16 is superposed on the top face of the container main body 14 to cover the upper opening of the housing recess 12, while the lens holding body 20 reaches a state of being stored and arranged on the bottom side of the housing recess 12. Under this closed condition, the contact lens 22 placed on the lens placing part 28 gets soaked in the preserving solution 23 contained in the housing recess 12. Since multiple through-holes 30 are formed in the lens placing part 28, the preserving solution 23 comes in contact with the back face of the contact lens 22 placed on the surface of the lens placing part 28 via such through-holes 30.

Figure 7:
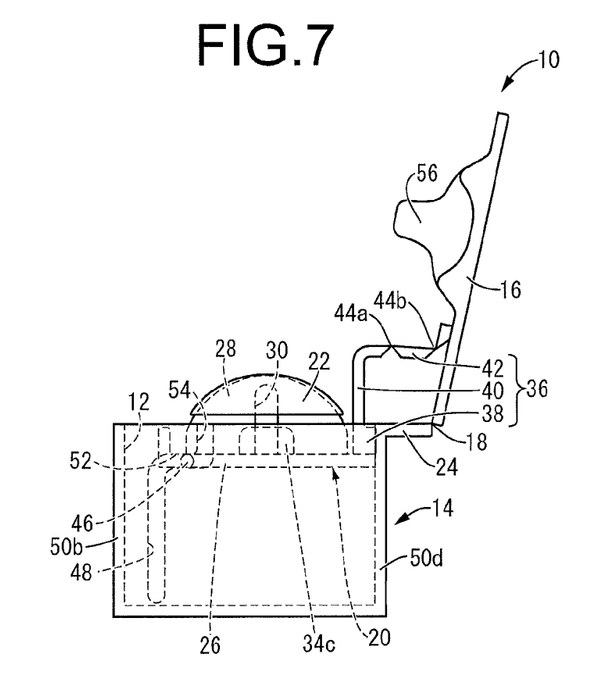
FIG. 7 is a side view showing another usage of the contact lens case shown in FIG. 1.
Figure 8:
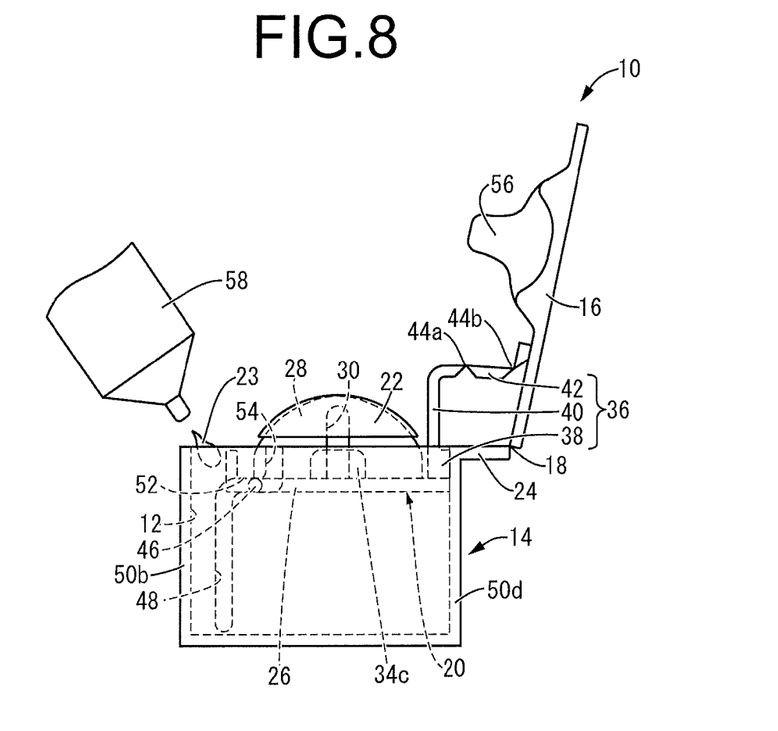
FIG. 8 is a side view showing still another usage of the contact lens case shown in FIG. 1.
Figure 9:
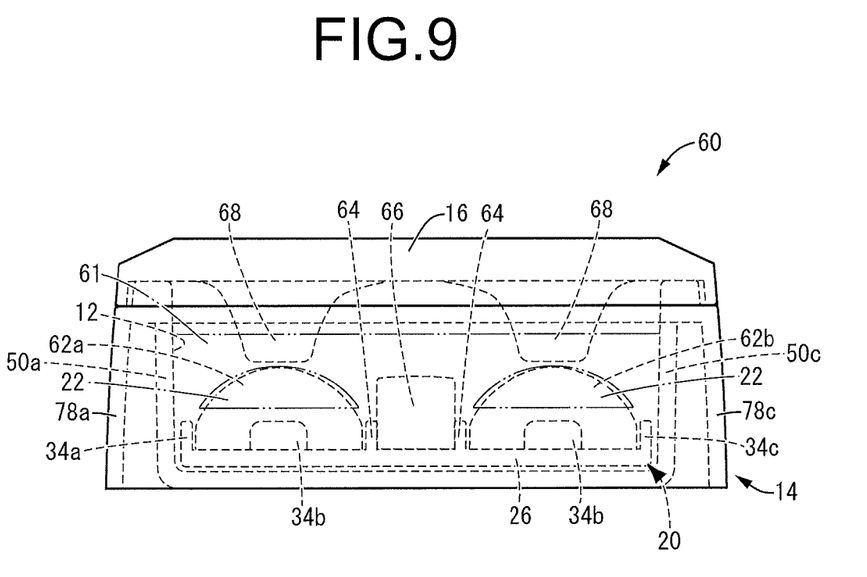
FIG. 9 is a front view of a contact lens case as a second embodiment of the present invention.
Figure 10:
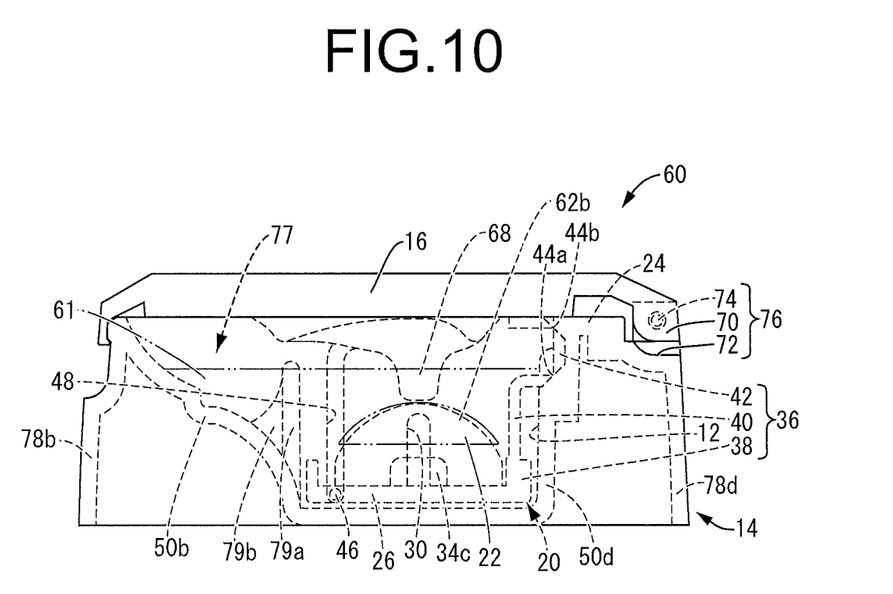
FIG. 10 is a side view of the contact lens case shown in FIG. 9.

When the user tries to wear the contact lens 22 again stored in the contact lens case 10 as described above, the lens holding body 20 can be displaced straight upward in the housing recess 12 only by means of rotating the lid 16 in the direction of opening as shown in FIGS. 6 and 7. The user can easily access to the lens placing part 28 of the lens holding body 20 displaced above the housing recess 12, being able to remove the contact lens 22 from the lens placing part 28 within a wide working space.

In addition, there is no need for inserting the fingers into the housing recess 12 in order to remove the contact lens 22 from the lens placing part 28, nor is there any problem of the preserving solution 23 being leaked from the housing recess 12. Also, since there is no need for picking up with the fingers the contact lens 22 under the condition of being soaked in the preserving solution 23, the contact lens 22 can be removed from the lens placing part 28 more reliably. In removing the contact lens 22 from the lens placing part 28, the front face of the contact lens 22 will be grasped by the fingers, thus avoiding the contact of the fingers with the back face of the contact lens 22 placed on the surface of the lens placing part 28. This enables to favorably avoid contamination of the back face of the contact lens 22 that comes in direct contact with the eye caused by a contact with the fingers.

As evident from the description above, in the present embodiment, the lens holding body 20 undergoes rising and falling displacement following the open and close action of the lid 16 around the hinge 18. Also, the direction of the rising and falling displacement of the lens holding body 20 is restricted to the vertical direction, which is the depth direction of the housing recess 12, due to the sliding protrusion 46 that protrudes from the lens holding body 20 being fitted and sliding in the guiding groove 48 that opens onto the inner face of the housing recess 12 while extending in the vertical direction. In the present embodiment, the displacement restricting member that restricts the direction of the rising and falling displacement of the lens holding body 20 to the vertical direction of the housing recess 12 comprises the guiding groove 48 and the sliding protrusion 46. Thus, since the displacement restricting member comprising the guiding groove 48 and the sliding protrusion 46 is provided between the opposing faces of the housing recess 12 and the lens holding body 20, displacement of the lens holding body 20 can be restricted without enlarging the size of the contact lens case 10.

Also, in the present embodiment, the direction of the rising and falling displacement of the lens holding body 20 following the open and close action of the lid 16 around the hinge 18 is restricted to the vertical direction of the housing recess 12 due to the displacement restricting member that comprises the guiding groove 48 and the sliding protrusion 46 so that the lateral or diagonally upward displacement of the lens holding body 20 is prevented in the preserving solution 23 filled in the housing recess 12. This makes it possible to favorably prevent the slip-down of the contact lens 22 from the lens placing part 28 following the rising and falling shift of the lens holding body 20. Therefore, just in case the contact lens 22 slips down from the lens placing part 28, only low protection walls 34a, 34b and 34c that are high enough to prevent the slip-down need to be provided, and yet would never get in the way when the contact lens 22 is being placed on the lens placing part 28.

Next, a contact lens case 60 according to a second embodiment of the present invention will be described in reference to FIGS. 9 to 16. The contact lens case 60 has a structure where disinfection treatment can be performed using hydrogen peroxide solution 61. In the following paragraphs, descriptions of the members and parts having a similar structure to that of the first embodiment are omitted as appropriate by assigning the same numerals as those of the first embodiment to the equivalent components. Also, for better understanding, the contact lens 22 and hydrogen peroxide solution 61 as a liquid agent contained in the contact lens case 60 are shown in imaginary lines in FIGS. 9 to 13, while guard walls 79a, 79b and the holding protrusion 68 are not shown in FIGS. 9 and 11, respectively.

In the contact lens case 60, the shapes of the lens holding body 20 and the container main body 14 are differentiated from those of the contact lens case 10 of the first embodiment. In more detail, the lens holding body 20 is in an approximate shape of a rectangle in a plan view where a pair of lens placing parts 62a, 62b are provided at both ends in the longitudinal direction. Also, in the middle of the longitudinal direction of the lens holding body 20, a pair of catalyst holding walls 64, 64 are formed between the pair of lens placing parts, and a metal catalyst 66 made of platinum and the like is held and positioned by the lens holding body 20 by being fitted between such catalyst holding walls 64, 64. Also in the lid 16 of the container main body 14, a pair of holding protrusions 68, 68 are provided at locations respectively corresponding to the pair of lens placing parts 62a, 62b.

Figure 14:
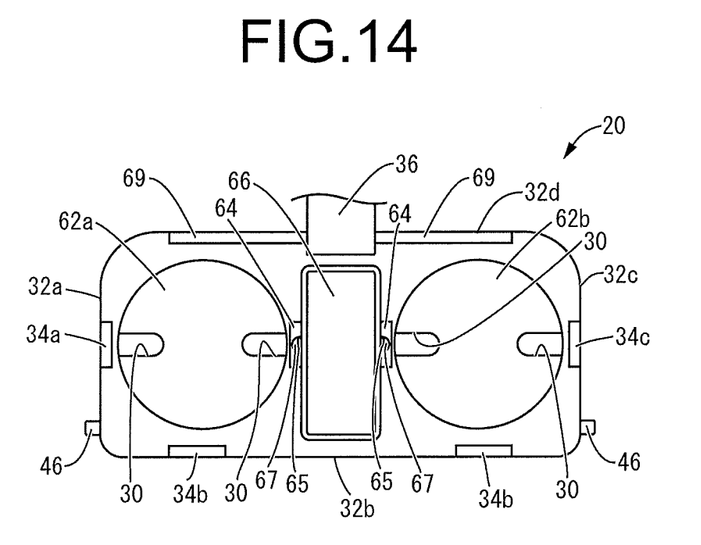
FIG. 14 is a plan view of a lens holding body constituting the contact lens case shown in FIG. 9.

More specifically, the metal catalyst 66 held nearly at the center of the lens holding body 20 is in an approximate shape of a rectangular block, and a pair of engaging protrusions 65, 65 are provided to protrude from the side faces opposing the catalyst holding walls 64, 64 (see FIG. 14). The metal catalyst 66 is held and positioned between the catalyst holding walls 64, 64 by the engaging protrusions 65, 65 being fitted from above in receiving grooves 67, 67 provided in the catalyst holding walls 64, 64.

Then, the pair of lens placing parts 62a, 62b provided on the lens holding body 20 are raised in a shape of a partial spherical shell that is convex upward from the base member 26 as in the previous embodiment. Also, at two locations of the lens placing parts 62a, 62b facing each other in the radial direction, the through-holes 30, 30 are provided vertically therethrough to extend from the outer periphery inward in the radial direction in a length short of reaching the center. In addition, along the side edge 32b of the base member 26 in the lens holding body 20, the protection walls 34b, 34b are provided at a position corresponding to the center of the lens placing parts 62a, 62b, respectively.

Also, along the side edge 32d of the base member 26, the base portion 38 of the connecting member 36 that connects the lid 16 with the lens holding body 20 is fixed and bonded in the middle of the length direction. In addition, a pair of protection walls 69, 69 are provided that extend from both edges of the base portion 38 in both directions in the length direction. The lens holding body 20 with the structure described above is connected to the lid 16 of the container main body 14 via the connecting member 36 as is the case with the previous embodiment.

Meanwhile, the housing recess 12 of the container main body 14 is in a shape of a bottomed rectangular prism in a size large enough to contain the lens holding body 20 in an approximate shape of a rectangle provided with the lens placing parts 62a, 62b. At the top edge of the side wall 50d of the container main body 14, the flange 24 is provided to protrude therefrom, and at each edge of the flange 24 in the longitudinal direction, a bearing 72 is provided whereby a shaft 70 provided along the side edge of the lid 16 is supported via a pin 74. By cooperation of the shaft 70, bearing 72 and pin 74, a hinge 76 is configured connecting the lid 16 with the container main body 14 in a freely openable and closable manner.

Figure 11:
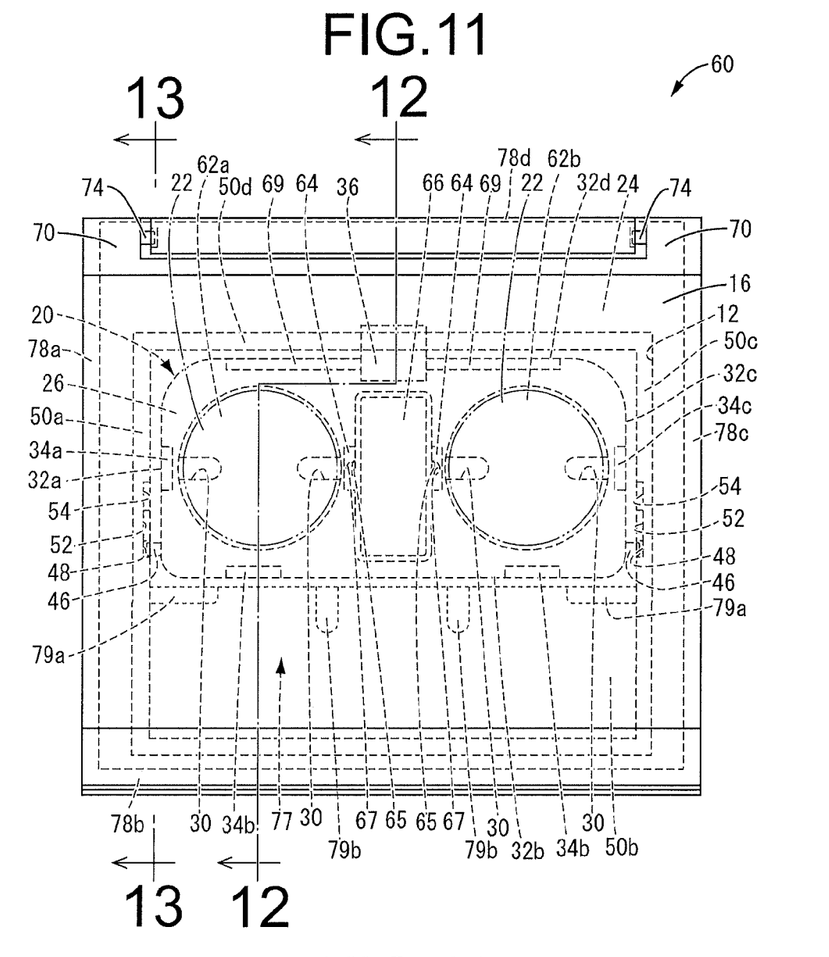
FIG. 11 is a plan view of the contact lens case shown in FIG. 9.

On the outer periphery of the side walls 50a through 50d of the container main body 14, reinforcing walls 78a through 78d that are connected respectively to the side walls 50a through 50d at the top edges thereof to extend downward are integrally provided. Under these circumstances, the side wall 50b extends out diagonally at an angle, whereas an extended area 77 is formed on the side of the side wall 50b of the housing recess 12. Then, between the extended area 77 and the lens holding body 20, four guard walls 79a, 79a, 79b, 79b are provided to protrude upward at a given height. As shown in FIG. 11, the guard walls 79a, 79a are connected to the side walls 50a, 50c of the container main body 14, extending out parallel to the side edge 32b of the lens holding body 20 in a given length within the container main body 14. Also, the guard walls 79b, 79b are positioned on both sides of the metal catalyst 66 in the mid-portion between the guard walls 79a, 79a to extend out in the direction perpendicular to the side edge 32b. Each space between two of the guard walls 79a, 79b, 79b, 79a adjacent to each other is made smaller than the diameter of the contact lens 22. This allows hydrogen peroxide solution 61 to flow into the housing recess 12 through each gap between two of the guard walls 79a, 79b, 79b, 79a when hydrogen peroxide solution 61 is filled via the extended area 77 described later so that, if by any chance the contact lens 22 drops down in the extended area 77, it is abutted against one of the guard walls 79a, 79b, 79b, 79a, thus preventing it from being drained into the housing recess 12.

The usage of the contact lens case 60 of the present embodiment with the structure described above will be explained in reference to FIGS. 15 and 16. When the contact lens 22 worn by the user is stored in the contact lens case 60, the lid 16 is first rotated in the direction of opening (to the right in FIG. 15) around the hinge 76 as described in FIG. 15. At this moment, the opening action of the lid 16 around the hinge 76 is transmitted as an external force that lifts up the middle portion 40 diagonally via the top portion 42 of the connecting member 36 due to the gradual extension thereof by the bending parts 44a, 44b. Such external force is also transmitted to the base member 26 of the lens holding body 20 to which the base portion 38 of the connecting member 36 is fixed and bonded so that the external force is applied to the entire lens holding body 20 to lift it up diagonally.

Under these circumstances, since even in the contact lens case 60, the sliding protrusions 46, 46 provided to protrude from the base member 26 of the lens holding body 20 are fitted in the guiding grooves 48, 48 that open on the inner face of the housing recess 12 in a similar way to the first embodiment, the sliding protrusions 46, 46 are guided to displace themselves only straight upward while sliding along the guiding grooves 48, 48 as the lid 16 is rotated in the direction of opening, thereby preventing any lateral or diagonally upward displacement.

Figure 15:
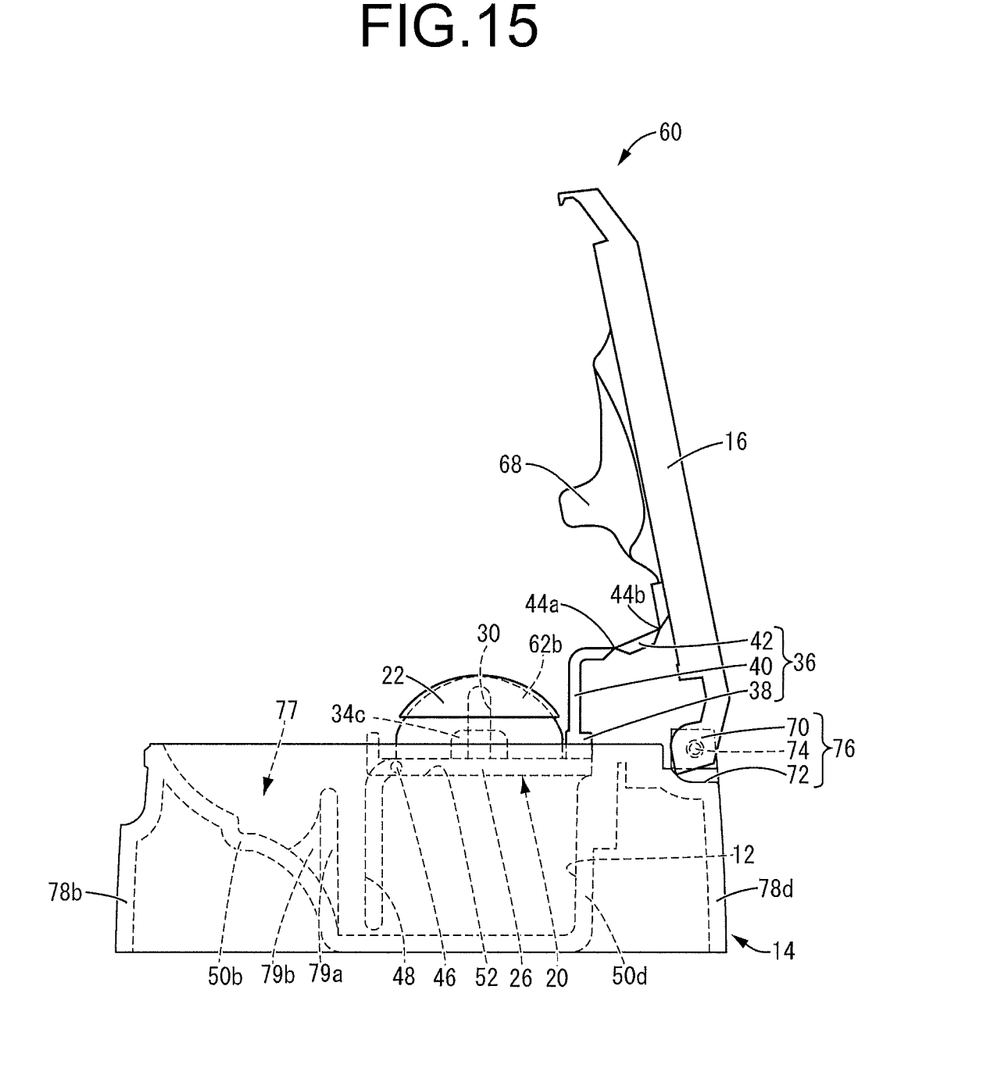
FIG. 15 is a side view showing a usage of the contact lens case shown in FIG. 9.

When the lid 16 is rotated further in the direction of opening after the sliding protrusions 46, 46 reach the top end of the guiding grooves 48, 48, an external force that laterally slides the lens holding body 20 in the direction getting closer to the hinge is transmitted via the connecting member 36. This allows the sliding protrusions 46, 46 of the lens holding body 20 to be fitted in the side grooves 52, 52 from the top end of the guiding grooves 48, 48, as shown in FIG. 15, to prevent downward displacement of the lens holding body 20. In summary, as is the case with the first embodiment, the temporary holding member that temporarily holds the lens holding body 20 in the same upper position of the housing recess 12 as the top end of the guiding grooves 48, 48 is configured by fitting the sliding protrusion 46 in the side groove 52.

Therefore, as is the case with the first embodiment, the lens placing parts 62a, 62b of the lens holding body 20 are temporarily held at a completely protruded position above the housing recess 12 so that the work of putting the contact lenses 22 on the lens placing parts 62a, 62b is made easier. Also, even if the housing recess 12 is filled with hydrogen peroxide solution 61 at this stage, the contact of the user's fingers with hydrogen peroxide solution 61 can be avoided, thus making it possible to prevent any danger for the user's fingers to touch the stimulant, namely hydrogen peroxide solution 61 before neutralizing reactions, and further for the eye to be exposed to hydrogen peroxide solution 61 when the contact lens 22 is removed therefrom with the fingers.

Especially in the present embodiment, since the lens holding body 20 is provided with the pair of lens placing parts 62a, 62b, open and close operation of the single lid 16 enables the lens placing parts 62a, 62b of the lenses for both eyes to rise and fall, thus further improving the operability. Also, compactization of the entire contact lens case 60 and reduction in the number of parts can be achieved.

Figure 16:
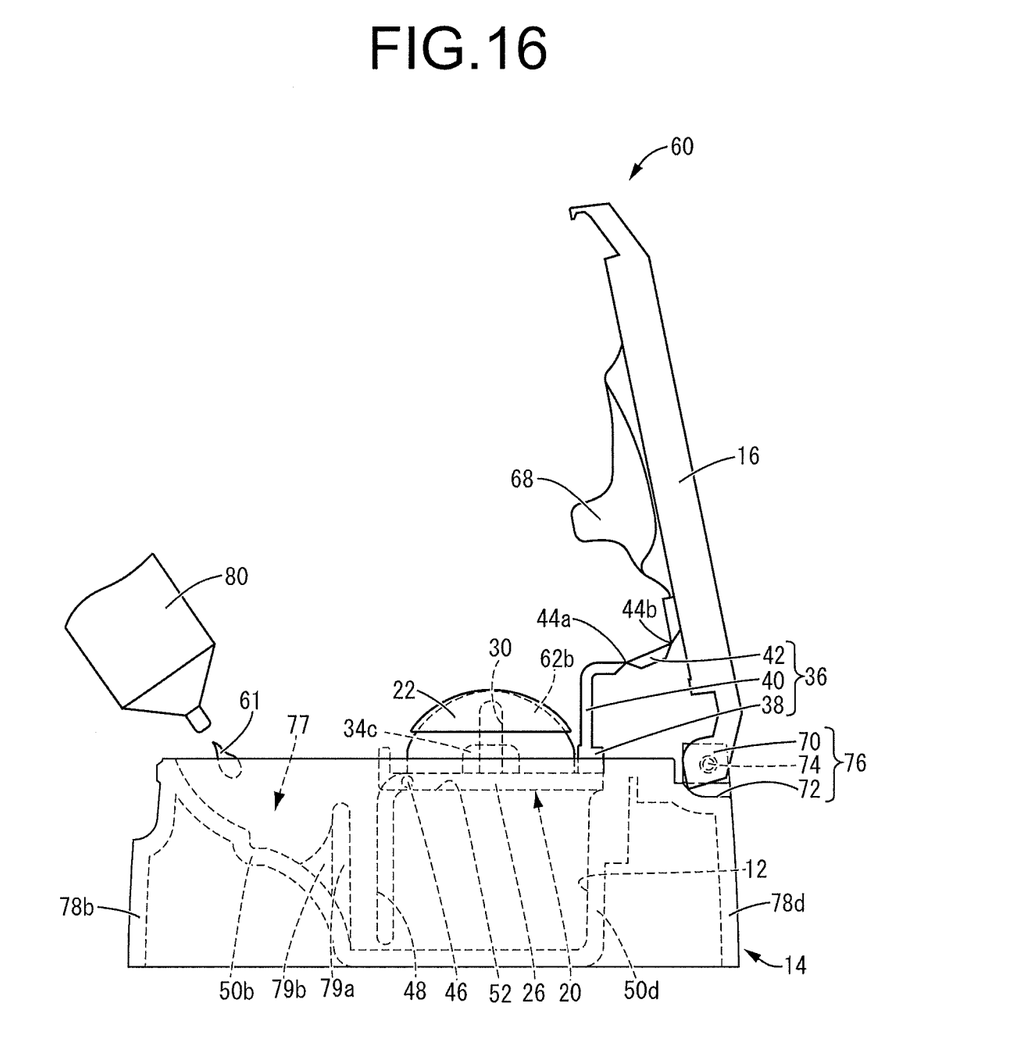
FIG. 16 is a side view showing another usage of the contact lens case shown in FIG. 9.

As shown in FIG. 15, filling the housing recess 12 with hydrogen peroxide solution 61 is operated before or after placing the contact lenses 22, 22 on the pair of lens placing parts 62a, 62b of the lens holding body 20. As shown in FIG. 16, in the present embodiment, the side wall 50b of the container main body 14 is inclined diagonally outward to form the extended area 77. Besides, the entire lens holding body 20 is displaced toward the hinge 76 for the purpose of fitting the sliding protrusions 46, 46 in the side groove 52. Therefore, a wide space is formed between the side wall 50b of the container main body 14 and the lens holding body 20. This makes it further easier to fill the housing recess 12 with hydrogen peroxide solution 61 contained in a container 80 via such space.

Then, the lid 16 is rotated in the direction of closing (to the left in FIG. 15) around the hinge 76 after the contact lens 22 is placed on the lens placing parts 62a, 62b and hydrogen peroxide solution 61 is filled in the housing recess 12. As described above, the closing action of the lid 16 is transmitted to the base member 26 via the connecting member 36 so that the sliding protrusions 46, 46 are guided along the guiding groove 48 to slide from the side groove 52 toward the bottom portion of the housing recess 12.

Figure 12:
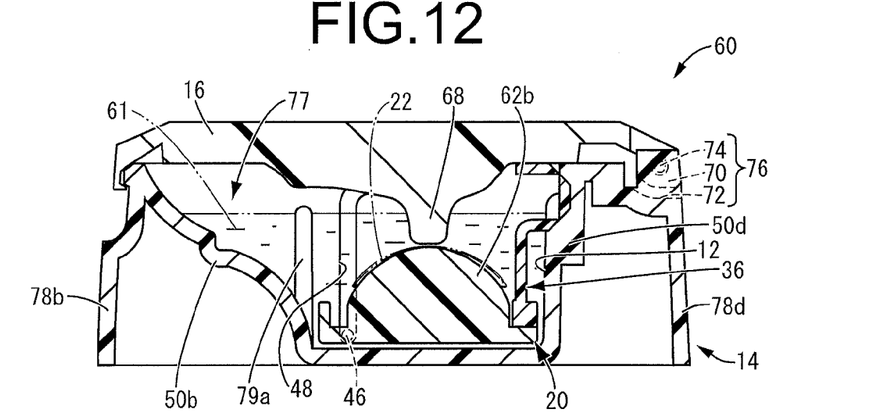
FIG. 12 is a cross-section view taken along line 12-12 of FIG. 11.
Figure 13:
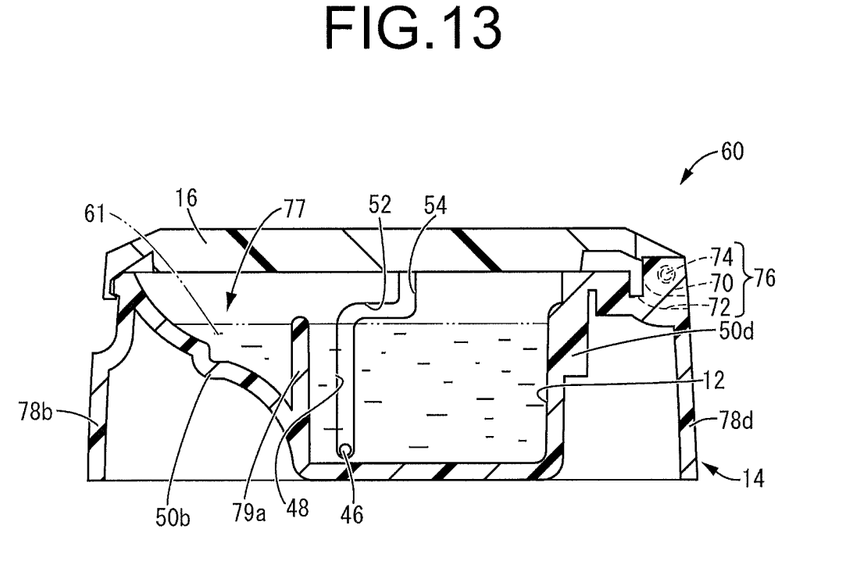
FIG. 13 is a cross-section view taken along line 13-13 of FIG. 11.

Thereafter, as shown in FIG. 12, the lid 16 is superposed on the top face of the container main body 14 to have the upper opening of the housing recess 12 covered by the lid 16, while the lens holding body 20 is stored and arranged in the bottom portion of the housing recess 12. Under such condition where the lens holding body 20 is covered, the contact lens 22 placed on the lens placing parts 62a, 62b of the lens holding body 20 and the metal catalyst 66 are soaked in hydrogen peroxide solution 61 contained in the housing recess 12. Under these circumstances, because the metal catalyst 66 is held by the lens holding body 20, hydrogen peroxide solution 61 stored in the housing recess 12 is surely prevented from starting to neutralize before the contact lens 22 is soaked in hydrogen peroxide solution 61, thus enabling to conduct the process of disinfecting the contact lens 22 with hydrogen peroxide solution 61 more effectively.

Since multiple through-holes 30 are formed in the lens placing parts 62a, 62b, the back face of the contact lens 22 placed on the surface of the lens placing part 28 is exposed to hydrogen peroxide solution 61 via the through-holes 30 to ensure full disinfection of the contact lens 22 in a stable manner. Also, since the holding protrusions 68, 68 are each arranged above the lens placing parts 62a, 62b to face each other with a gap in between, even if the contact lenses 22, 22 float up from the lens placing parts 62a, 62b due to the foaming caused by neutralization process of hydrogen peroxide solution 61, the contact lenses 22, 22 are displaced back toward the lens placing parts 62a, 62b by being abutted against the holding protrusions 68, 68, thereby favorably preventing the contact lenses 22, 22 from coming off of the lens placing parts 62a, 62b.

Embodiments of the present invention have been described in detail above, but these are just examples, and the present invention is not to be interpreted as limited to the specific descriptions of those embodiments.

Figure 17A:
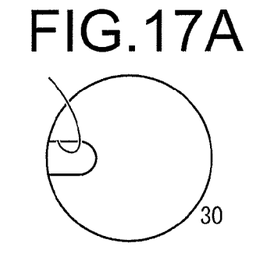
FIGS. 17A-17E are plan views showing other configurations of lens placing parts in the lens holding body shown in FIGS. 5 and 14.
Figure 17B:
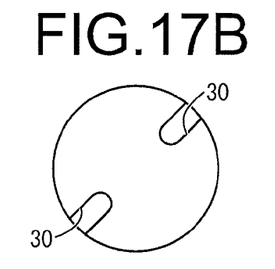
Figure 17C:
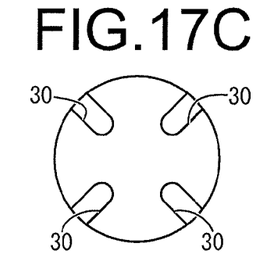
Figure 17D:
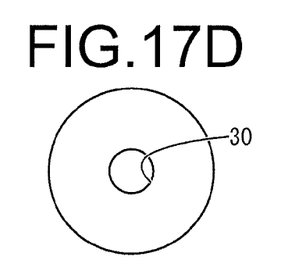
Figure 17E:
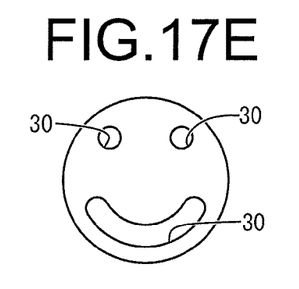

For example, the shape of the lens placing parts 28, 62a, 62b provided in the lens holding body 20 can be configured by a semi-spherical depression that is convex downward other than the partial spherical shell that is convex upward. Also, the shape, number and position of the through-holes 30 to be provided in the lens placing parts 28, 62a and 62b can be arbitrarily set. For example, as shown in FIG. 17A, a single through-hole 30 can be provided from the outer periphery in a length short of reaching the center, or as shown in FIGS. 17B, 17C, the position of the through-hole 30 can be diagonally set against the extending direction of the hinge 18 or 76. Also, as shown in FIG. 17D, a single circular through-hole 30 can be provided at the center of the lens placing parts 28, 62a, 62b. Furthermore, as shown in FIG. 17E, the shape and arrangement of the through-hole 30 can be determined considering the overall design.

Also, the shape of the connecting member 36 that connects the lens holding body 20 with the lid 16 can be in any shape as long as it transmits the rotation of the lid 16 to the lens holding body 20, and any structure can be adopted such as the one with a link mechanism with a bent in the middle or the one made of elastic members in a form of a fully deformable rod. The connecting member 36 is preferably provided with the base portion 38 and the middle portion 40 that rise from the lens holding body 20, but the top portion 42 as a whole can be configured with a flexurally deformable piece other than the structure made bendable at the bending parts 44a, 44b.

Moreover, the displacement restricting member can be, other than the combination of the guiding groove 48 and the sliding protrusion 46, the one that restricts the direction of the rising and falling displacement of the lens holding body 20 to the vertical direction by means of inserting a guide rod protruding upward from the bottom portion of the container main body 14 through the through-hole formed in the lens holding body 20.

In addition, the temporary holding member that temporarily holds the lens holding body 20 in the upper position of the housing recess 12 is not limited to the one exemplified above. For example, it can also be configured with a mechanism in which an engaging protrusion that is flexurally deformable outward is provided at the upper end of the guiding grooves 48, 48, whereby the sliding protrusion 46 is temporarily held on the top face of the engaging protrusion by significantly rotating the lid 16 to allow the sliding protrusion 46 to override the engaging protrusion.

KEYS TO SYMBOLS

10, 60: Contact lens case; 12: Housing recess; 14: Container main body; 16: Lid; 18, 76: Hinge; 20: Lens holding body; 22: Contact lens; 23: Preserving solution (liquid agent); 28, 62a, 62b: Lens placing part; 36: Connecting member; 46: Sliding protrusion (displacement restricting member, temporary holding member); 48: Guiding groove (displacement restricting member); 52: Side groove (temporary holding member); 61: Hydrogen peroxide solution (liquid agent); 66: Metal catalyst (catalyst)

The invention claimed is:

1. A contact lens case comprising:
   a container main body provided with a housing recess configured to store a contact lens and a liquid agent for soaking the contact lens;
   a lid that is connected to the container main body via a hinge in a freely openable and closable manner so as to cover an upper opening of the housing recess;
   a lens holding body that holds the contact lens housed in the housing recess in a displaceable manner;

a connecting member that connects the lid and the lens holding body so that the lens holding body undergoes rising and falling displacement following open and close action of the lid around the hinge; and a displacement restricting member that restricts a direction of the rising and falling displacement of the lens holding body to a vertical direction that coincides with a depth direction of the housing recess, wherein the displacement restricting member comprises a guiding groove that opens onto an inner surface of the housing recess while extending in the vertical direction and a sliding protrusion that protrudes from the lens holding body and is fitted in the guiding groove to slide into the guiding groove.

2. The contact lens case according to claim 1, further comprising a temporary holding member that temporarily holds the lens holding body at an upper position of the housing recess where the lens holding body is displaced by opening the lid.

3. The contact lens case according to claim 1, wherein a top end of the guiding groove is bent toward the hinge of the lid so as to be connected to a side groove that extends in a lateral direction, and a temporary holding member that temporarily holds the lens holding body at an upper position of the housing recess is provided by the sliding protrusion being fitted in the side groove.

4. The contact lens case according to claim 1, wherein the liquid agent that the housing recess is configured to store is hydrogen peroxide solution, and a catalyst is held by the lens holding body.

5. The contact lens case according to claim 1, further comprising a pair of lens placing parts that is provided in the lens holding body.

6. The contact lens case according to claim 5, wherein the pair of lens placing parts have a shape of a partial spherical shell that is convex upward.

\* \* \* \* \*